United States Patent
Ramachandran (10) Patent No.: US 9,013,343 B2
(45) Date of Patent: Apr. 21, 2015

(54) CONTROLLERS AND METHODS FOR ACCEPTING MULTIPLE DIFFERENT TYPES OF INPUT SIGNALS

(75) Inventor: Anil Ramachandran, Florissant, MO (US)

(73) Assignee: Emerson Electric Co., St. Louis, MO (US)

( * ) Notice: Subject to any disclaimer, the term of this patent is extended or adjusted under 35 U.S.C. 154(b) by 545 days.

(21) Appl. No.: 13/467,791

(22) Filed: May 9, 2012

(65) Prior Publication Data

US 2013/0304260 A1 Nov. 14, 2013

(51) Int. Cl.
*H03M 1/12* (2006.01)
*G08B 25/00* (2006.01)
*G08B 21/00* (2006.01)
*G05B 15/00* (2006.01)
*G05B 13/00* (2006.01)
*G05D 23/00* (2006.01)
*G05B 19/042* (2006.01)
*G05B 19/05* (2006.01)

(52) U.S. Cl.
CPC .......... *G05B 19/0423* (2013.01); *G05B 19/05* (2013.01)

(58) Field of Classification Search
CPC ... G01D 21/02; G05B 19/0423; H03M 1/124; G01R 31/007
USPC ........ 340/500, 501, 517, 524, 525, 635, 657, 340/660, 664; 341/126, 155; 700/83, 275, 700/276
See application file for complete search history.

(56) References Cited

U.S. PATENT DOCUMENTS

| 3,932,810 | A |   | 1/1976 | Kohler et al. |
| 4,074,193 | A |   | 2/1978 | Kohler |
| 4,115,706 | A | * | 9/1978 | Yamaguchi ..................... 326/60 |
| 4,274,087 | A | * | 6/1981 | Swanson et al. .............. 340/525 |
| 4,922,194 | A | * | 5/1990 | Gaussa et al. ............. 324/756.07 |
| 7,639,227 | B2 | * | 12/2009 | Chuang et al. ................ 345/100 |
| 7,960,953 | B2 | * | 6/2011 | Inoue ............................. 323/273 |
| 8,373,586 | B2 | * | 2/2013 | Alley et al. ................... 341/155 |
| 8,648,610 | B2 | * | 2/2014 | Mikami et al. ................ 324/555 |
| 2004/0202215 | A1 | * | 10/2004 | Fairgrieve .................. 372/38.02 |

* cited by examiner

*Primary Examiner* — Crystal J Barnes-Bullock (74) *Attorney, Agent, or Firm* — Harness, Dickey & Pierce, P.L.C.

(57) ABSTRACT

According to various aspects, exemplary embodiments are disclosed of controllers and methods for accepting multiple different types of input signals. One example controller includes an input circuit including first and second input terminals for receiving an input signal and at least one programmable resistor coupled to the first terminal. A processing device is coupled to the input circuit. The processing device is configured to control a resistance of the at least one programmable resistor based on a terminal setting. The terminal setting indicates whether the input signal is a voltage signal, a current signal, or a resistance signal. The processing device is configured to interpret the input signal applied to the processing device via the input circuit.

19 Claims, 2 Drawing Sheets

CONTROLLERS AND METHODS FOR ACCEPTING MULTIPLE DIFFERENT TYPES OF INPUT SIGNALS

FIELD

The present disclosure relates generally to controllers and methods, and more particularly, to accepting multiple different types of input signals.

BACKGROUND

This section provides background information related to the present disclosure which is not necessarily prior art.

Various known systems, such as HVAC (heating ventilation and air conditioning) systems, may include multiple different types of devices having multiple different types of signals. In various systems, one or more central devices may be required to receive signals from multiple different types of devices within the system. As such, some known devices within the system are designed to include different input terminal pairs, each terminal pair specific to a different type of input signal. For example, a thermostat may include two terminal pairs structured to receive voltage signals, and another terminal pair structured to receive a current signal. The terminal pairs are connected through separate, dedicated circuits to one or more analog-to-digital converters. Other known devices have one or more terminals pairs, which include dipswitches associated therewith to selectively modify the scaling of the input signal received by the device. In such devices, the user is additionally required to identify the type of input signal to the device, to enable proper processing of the input signal.

SUMMARY

This section provides a general summary of the disclosure, and is not a comprehensive disclosure of its full scope or all of its features.

According to various aspects of the disclosure, an exemplary controller embodiment is disclosed for accepting multiple different types of input signals. The controller includes an input circuit including first and second input terminals for receiving an input signal and at least one programmable resistor coupled to the first terminal. A processing device is coupled to the input circuit. The processing device is configured to control a resistance of the at least one programmable resistor based on a terminal setting. The terminal setting indicates whether the input signal is a voltage signal, a current signal, or a resistance signal. The processing device is configured to interpret the input signal applied to the processing device via the input circuit.

According to another aspect of the disclosure, another exemplary controller embodiment is disclosed for accepting multiple different types of input signals. The controller includes an input circuit including first and second terminals for receiving an input signal from a device within a climate control system. The input circuit includes a first programmable element. The controller includes a user interface for receiving a terminal setting from a user and a processing device coupled to the input circuit and the user interface. The processing device is configured to set a parameter of the first programmable element to a first value when the terminal setting indicates the input signal is one type of signal, and to set the parameter of the first programmable element to a second different value when the terminal setting indicates the input signal is a different type of signal. The processing device is configured to interpret the input signal applied to the processing device via the input circuit.

According to yet another aspect of the disclosure, an exemplary method is disclosed for accepting multiple different types of input signals. The method includes receiving, at an input circuit, an input signal indicative of a condition of a system. The method also includes controlling, by a processing device, at least one parameter of at least one programmable element of the input circuit based on a terminal setting and at least one operating parameter of the processing device. The method further includes interpreting, by the processing device, the input signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As explained above in the background, various systems include multiple different types of signals, such as, for example, sensors, controls, feedback circuits, user interface devices, controllers, and other devices, generate signals relating to information within the system (e.g., climate control systems, motor systems, water systems, fluid systems, automated systems, control systems, or other systems, etc.). The inventor hereof discloses exemplary embodiments of controllers (e.g., thermostats, etc.) for accepting multiple different types of input signals. The exemplary controller embodiments include a single input circuit associated with each pair of input terminals. The input circuit is controllable depending on the type of input signal applied to the terminals. Also disclosed are exemplary methods performed by these and other controllers to accept multiple different types of input signals through a single input circuit.

Figure 1:
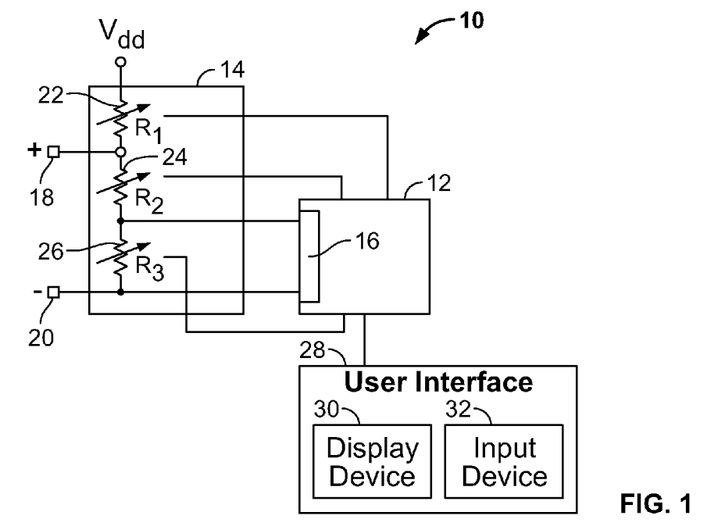
FIG. 1 is a schematic diagram of an exemplary embodiment of a controller.

FIG. 1 illustrates an exemplary embodiment of a controller 10 embodying one or more aspects of the disclosure. In this illustrated example of FIG. 1, the controller 10 includes a processing device 12 and an input circuit 14. The input circuit 14 is coupled to the processing device 12. The processing device 12 includes an analog-to-digital converter 16, which is coupled to the input circuit 14.

The processing device 12 may include, without limitation, a general purpose processor unit (CPU), a microcontroller, a reduced instruction set computer (RISC) processor, an application specific integrated circuit (ASIC), a programmable logic circuit (PLC), a programmable gate array (PGA), discrete circuitry, and/or any other circuit or processor capable of executing the functions described herein. For example, the processing device 12 may include a microcontroller with an analog-to-digital converter included therein and/or a processor with one or more external discrete circuits suitable to convert an analog signal to a digital signal (e.g., an analog-to-digital converter), or vice-versa. The methods disclosed herein may be encoded as firmware into the processing device 12 and/or executable instructions embodied in computer-readable media, contained within the processing device 12, and/or separate from the processing device 12 in one or more associated memory devices.

As shown in FIG. 1, the controller 10 includes two terminals 18 and 20 provided to receive an input signal from one or more devices within an exemplary system. The input circuit 14 includes three programmable elements 22, 24, and 26. The programmable element 24 is connected in series with the programmable element 26. The series combination of programmable elements 24 and 26 is connected across the terminals 18 and 20. Further, programmable element 26 is connected across the input to the analog-to-digital converter 16. Programmable element 22 is connected between the terminal 18 and a voltage source ($V_{dd}$). It should be appreciated that one of more different configurations of the programmable elements may be used in other controller embodiments, potentially depending on the type, number, and/or structure of the programmable elements, the processing device 12, and/or the input signals expected to be received by the controller.

The programmable elements 22, 24, and 26 are coupled to the processing device 12, which provides one or more control signals to the programmable elements 22, 24, and 26. The control signals are provided to alter one or more parameters of the programmable elements 22, 24, and 26. Such parameters may include, without limitation, resistance, capacitance, and/or inductance, etc. In the exemplary embodiment, the programmable elements 22, 24, and 26 are programmable resistors, such as variable resistors. As such, the programmable elements 22, 24, and 26 may be programmed to exhibit multiple different resistances, based on the specific control signal applied thereto. It should be appreciated that a different number or type of programmable elements may be employed in other embodiments. For example, programmable elements may include, without limitation, variable resistors, variable reactance elements, transistors, relays, or other elements directly or indirectly controllable by the processing device. Accordingly, it should be appreciated that in these and other examples, one or more control signals from a processing device may alter the resistance, capacitance, inductance, and/or other characteristics/states of the programmable elements of the input circuit 14.

More generally, a processing device may be employed to alter one or more parameter of one or more programmable elements of an input circuit, to permit the input circuit 14 to accept multiple different types of signals. Additionally, such parameters may be altered to protect the processing device 12 from potentially dangerous voltage and/or current situations.

When the controller 10 is used within one or more systems, a device is often coupled to terminals 18 and 20 to provide an input signal thereto. Generally, the input signal is representative of information, such as, for example, temperature, humidity, pressure, airflow, fan/blower speed, motion detection, contact positions, user interface settings, diagnostic, or other information, etc. In various embodiments, the information is represented by the different voltages, currents, or resistances of the input signal. For example, a voltage of 2.6 VDC (Volts of Direct Current) may be representative of a temperature of 72° F., while a voltage of 2.75 VDC may be representative of a temperature of 86° F. A different type of input signal may represent the same temperature information by current or resistance rather than voltage. In this manner, information is transmitted from within the system to the controller 10 by different types of input signals.

In the exemplary embodiment, the processing device 12 is configured to control one or more of the programmable elements 22, 24, and 26 to enable the controller 10 to accept the multiple different types of input signals and to interpret the input signal applied to the processing device by the input circuit 14.

In the exemplary embodiment of FIG. 1, when the input signal is a voltage signal, the processing device 12 sets the programmable element 22 to a high resistance, such as open, a substantially high resistance as compared to programmable elements 24 and 26, and/or a sufficiently high resistance to avoid distortion of the input signal voltage. Additionally, the processing device 12 controls the resistances of programmable elements 24 and 26, so that programmable elements 24 and 26 act as a voltage divider between the inputs terminals 18 and 20 and the analog-to-digital converter 16. The voltage applied to the analog-to-digital converter 16 ($V_{ADC}$) may be calculated as:

$$V_{ADC} = (V_{input\ signal} * R_{26}/(R_{24}+R_{26}))$$

where $V_{ADC}$ is the voltage at the analog-to-digital converter 16 ($V_{ADC}$) $V_{input\ signal}$ is the voltage of the input signal, and $R_{24}$ and $R_{26}$ are the resistances of the exhibited programmable element 24 and 26 as controlled by the processing device 12. Because the processing device 12 measures the voltage at the analog-to-digital converter 16 ($V_{ADC}$) and knows the resistances of programmable elements 24 and 26 ($R_{24}$ and $R_{26}$), the processing device 12 is able to calculate the voltage of the input signal ($V_{input\ signal}$). The input circuit 14 thus permits the processing device 12 to accurately determine the voltage of the input signal.

Moreover, by use of the programmable elements 22, 24, and 26, the input circuit 14 may permit the controller 10 to accept signals having a voltage range in excess of one or more ratings of the processing device 12, while substantially inhibiting the potential for damage to the processing device 12. In one example, an input signal has a voltage range of approximately 0-24 VDC, while an operating parameter indicates the input of the analog-to-digital converter 16 is limited to, for example, 12 VDC (e.g., a maximum voltage rating, etc.). The processing device 12 is able to control the programmable elements 24 and 26 to reduce the 24 VDC input signal to a voltage within the operating parameter of the analog-to-digital converter 16. Specifically, for example, the programmable element 24 may be controlled to exhibit a resistance of 2 kΩ, while the programmable element 26 may be controlled to exhibit a resistance of 1 kΩ. According to the equation above, the programmable elements 24 and 26 operate to divide the peak voltage of 24 VDC to a peak voltage of about 8 VDC, within the maximum voltage rating of the analog-to-digital converter 16.

It should be appreciated that one or more additional or alternative operating parameters of the processing device 12, or more generally, the controller 10, may be used to control one or more of the programmable elements. Such operating parameters may include, for example, maximum current rating, maximum power rating, etc., of the controller 10, including the processing device 12 and/or the programmable elements 22, 24, and 26. Moreover, the processing device 12 may control the programmable elements 22, 24, and 26, potentially based on other factors, such as, operating characteristics of devices coupled to the controller 10, consistent interpretation among different input signals, predetermined scaling, estimate input signals, most popular input signals, etc.

In some embodiments, the processing device 12 may further control the programmable elements 22, 24, and 26 in a variety of different manners, to provide a reduced, minimal, or no effect on the voltage of the input signal, when the input signal is a voltage signal. In one example, programmable element 24 is controlled to exhibit a short (a substantially 0Ω resistance), to permit the voltage of the input signal to be substantially directly applied to the analog-to-digital converter 16 of the processing device 12.

In the exemplary embodiment, when the input signal is a resistance signal, the processing device 12 controls the programmable elements 22, 24, and 26 to control a voltage range across programmable element 26, which is acceptable to the analog-to-digital converter 16. Specifically, the voltage applied to the analog-to-digital converter 16 ($V_{ADC}$) of the processing device 12 may be calculated as:

$$V_{ADC} = \frac{((V_{dd} * R_{input\,signal} * (R_{24} + R_{26}))/(R_{input\,signal} + R_{24} + R_{26}))}{(R_{22} + (R_{input\,signal} * (R_{24} + R_{26}))/(R_{input\,signal} + R_{24} + R_{26}))}$$

where $V_{ADC}$ is the voltage at the analog-to-digital converter 16, $V_{dd}$ is the voltage of the voltage source, $R_{input\,signal}$ is the resistance of the input signal, and $R_{22}$, $R_{24}$, and $R_{26}$ are the resistances of the respective programmable elements 22, 24, and 26. The voltage is measured at the analog-to-digital converter 16 ($V_{ADC}$), while the voltage of the voltage source ($V_{dd}$) and resistances of programmable elements 22, 24, and 26 ($R_{22}$, $R_{24}$, and $R_{26}$) are known. Thus, the only unknown from the equation above is the resistance exhibited by the input signal ($R_{input}$ signal), which is calculated by the processing device 12. In this manner, the processing device 12 is further configured to accept and to interpret an input signal having a resistance value representative of information.

In various embodiments, an input signal may exhibit a number of different resistances to convey a variety of information, including, without limitation, temperature information, pressure information, etc. Additionally, or alternatively, resistance of an input signal may indicate the open state or closed state of a switching device. When a switching device is coupled to the terminals 18 and 20, for example, an input signal indicative of the state of the switching device is provided at terminals 18 and 20. Specifically, when the switching device is open, a substantially high resistance is provided at the terminals 18 and 20. The substantially high resistance allows the above equation to be reduced to a voltage divider according to the following equation:

$$V_{ADC} = (V_{dd} * R_{26}/(R_{22} + R_{24} + R_{26}))$$

Generally, during an open state of the switching device, the processing device 12 interprets any voltage as the switching device being in an open state. When the switch input is closed, however, a short is provided across the terminals 18 and 20, which results in substantially 0 VDC at the analog-to-digital converter 16 of the processing device 12. It should be appreciated that a variety of different voltages, resistance and/or current signals may be used to indicate one or more states associated with a device (e.g., a switching device, etc.) coupled to terminals 18 and 20.

In the exemplary embodiment, when the input signal is a current signal, the processing device 12 sets the programmable element 22 to a high resistance and sets the programmable element 24 to a substantially low resistance, such as, for example, a short and/or substantially 0Ω. Further, the processing device 12 controls the resistance of the programmable element 26 to provide the current signal to the processing device 12, within one or more operating parameters of the analog-to-digital converter 16. In one example, the processing device 12 controls the programmable element 24 to exhibit a sufficiently high resistance, so that the expected current range at the analog-to-digital converter 16 is within one or more of its operating parameters, and without the current signal being distorted. The processing device 12 is then able to measure the voltage across the programmable element 26. From the measured voltage, and the known resistance of the programmable element 26, the processing device 12 is then able to calculate the current through programmable element 26, which corresponds to the current of the input signal.

As described, the controller 10 is therefore configured to accept each of a voltage signal, a resistance signal, and a current signal at the terminals 18 and 20 through input circuit 14. Because the input circuit 14 is used to adjust and/or apply the input signal to the processing device 12 regardless of the type of input signal, the exemplary controller 10 avoids the use of separate, dedicated circuits for receiving each type of input signals.

Figure 2:
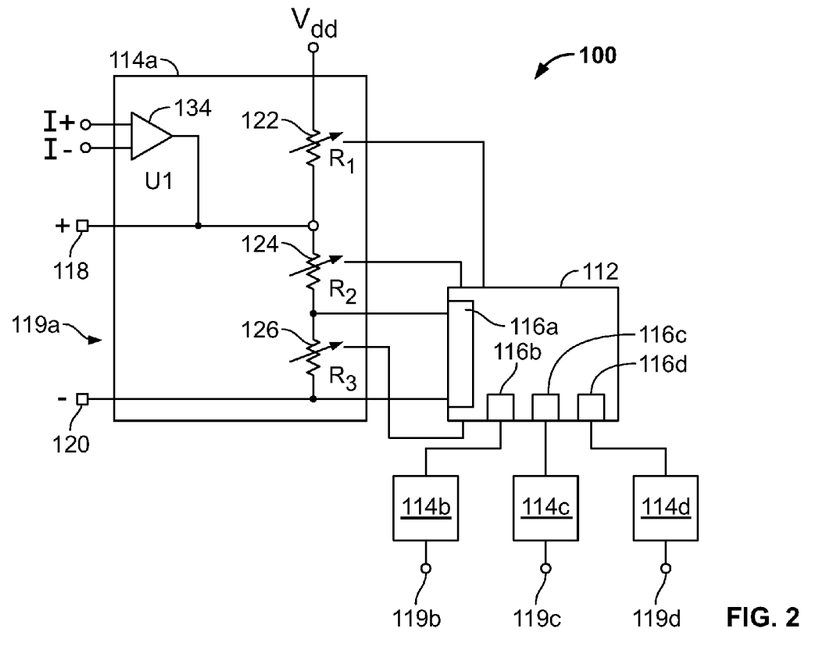
FIG. 2 is a schematic diagram of another exemplary embodiment of a controller.

FIG. 2 illustrates another exemplary controller embodiment. In this exemplary embodiment, the controller 100 includes a processing device 112, an input circuit 114, and terminals 118 and 120, which may be the same of substantially similar to the corresponding features of the controller 10 illustrated in FIG. 1. In this example, the controller 100 includes a current-to-voltage converter 134. The current-to-voltage converter 134 may include, without limitation, an operational amplifier, a comparator, or another device suitable to provide a voltage indicative of an input current, etc. As shown, the current-to-voltage converter 134 is coupled to the terminal 118. The current-to-voltage converter 134 is operable for providing a voltage signal indicative of the current signal to terminal 118 and the programmable elements 122, 124, and 126. The voltage signal is subsequently interpreted by the processing device 112, substantially consistent with the description above. In this embodiment, additional terminals to receive the input signal may be used. Additionally, or alternatively, one or more relays and/or jumpers may be used to selectively apply the input signal to either terminals 118 and 120, or terminals associated with the current-to-voltage converter 134. Such relays and/or jumpers may be controlled via user interaction and/or the processing device 112 in various embodiments.

In the exemplary embodiment, the current-to-voltage converter 134 may be operated according to one or more discrete components associated therewith to control gain and/or other parameters of the current-to-voltage converter 134. Alternatively, the processing device 112 may provide one or more control signals to the current-to-voltage converter 134 to control one or more operating parameters, such as, for example, gain of the current-to-voltage converter 134. In one example, the processing device 112 may control the gain of the current-to-voltage converter 134 based on an expected current range of the input signal applied to the controller 100, and/or one or more operating parameters of the processing device 112. Further, whether or not controls signals are provided to the current-to-voltage converter 134, the programmable elements 122, 124, and 126 may be further controlled to permit the processing device 112 to safely receive the input signal applied by the input circuit 114 and/or interpret the same.

In the exemplary embodiments disclosed herein, the processing device controls the programmable elements depending on the type of signal applied to the terminals. The type of signal applied to the controller may be specific to the device coupled to the controller. Accordingly, when a device is coupled to the terminals of the controller, a user may indicate the type of signal transmitted from the specific device to permit the processing device to properly accept and interpret the input signal. In the embodiment of FIG. 1, for example, the controller 10 includes a user interface 28. The user interface 28 is coupled to the processing device 12 to permit a user (e.g., a technician, an operator, an installer, a homeowner, etc.) to provide and/or to select one or more terminal settings indicating the type of signal applied to terminals 18 and 20.

In the exemplary embodiment of FIG. 1, the user interface 28 includes a display device 30 and an input device 32, which are coupled to the processing device 12. The display device 30 may include, for example, a liquid crystal display (LCD), a light-emitting diode (LED) display, an organic LED (OLED) display, and/or an "electrical-ink" display, etc. The display device 30, in combination with the processing device 12, displays information, such as menus, selectable settings, configuration data, controls, and/or any other types of information to the user. Further, the input device 32 may include, for example, a keyboard, one or more buttons, a directional pad, a mouse, a touch sensitive panel (e.g., a touchscreen or a touch pad, etc.), one or more switches, or any other devices suitable for a user to provide an input and/or setting to the processing device 12. In at least one embodiment, the display device 30 and at least one input device 32 are incorporated into a touchscreen display. Multiple different display device 30 and/or input devices 32 may be included in various controller embodiments.

The exemplary controller 10 is configured to display, via the display device 30, one or more terminal settings, which are selectable or settable by a user.

In the exemplary embodiment, the processing device 12 is configured to solicit a terminal setting from the user, which is associated with the terminals 18 and 20. More specifically, when a device is coupled to terminals 18 and 20 during initial setup or maintenance or another time, the user provides one or more inputs to the controller 10 to indicate the type of signal, which will be provided by the device. The type of signal from the device may include, for example, a resistance signal, a current signal, a voltage signal, or another type of signal. In one example, the controller 10 displays, via display device 30, multiple different types of signals from which the user is able to select by an input to input device 32. Additionally, or alternatively, the controller 10 may prompt the user, via the display device 30, to enter a type of input signal, thereby providing the terminal setting.

In addition to the type of the input signal, the terminal setting may include other information about the input signal provided from the device coupled to terminals 18 and 20. The terminal setting, for example, may include information regarding the range of the input signal. In one example, a terminal setting indicates that the input signal is a voltage signal, in the range between 0 and 24 VDC. In one or more other examples, the terminal setting may indicate a resistance range, a current range, or other ranges. The ranges may be used by the processing device 12 to interpret the input signal and/or to control the programmable elements 22, 24, and/or 26 to sufficiently protect the processing device 12 from input signals in excess of one or more of its operating parameters.

The terminal setting may further define a conversion between a measured voltage at the analog-to-digital converter 16 and the information associated with or indicated by the input signal. For example, a temperature sensor device may be coupled to controller 10 and provide a resistance signal indicative of an ambient temperature. Through the operation described above, the processing device 10 is able to determine the input signal to have a resistance of 330Ω. The processing device 12 may then convert the 330Ω based on the terminal setting, to a corresponding ambient temperature of 80° C., thereby interpreting the input signal.

The conversion of the value of the input signal to the information provided by the input signal may be provided by a scaling factor, an equation, a look-up table, and/or other processing input or description provided by the terminal setting, and/or contained within the processing device 12.

In another example, a device may provide a voltage signal from 0-10 VDC indicating a suction pressure to the controller 10. When the processing device 12 measures the 0-10 VDC voltage (or another voltage range depending on the programmable elements 24 and 26), the processing device 12 may use one or more scaling factors, equations, and/or look-up tables to convert the voltage of the input signal to the corresponding suction pressure. An equation, for example, may define a linear or a non-linear relationship between the voltage and the suction pressure. Such scaling factors, equations, and/or look-up tables may be provided based on empirical data, such as measured voltages of the device during known suction pressure. Additionally, or alternatively, the scaling factors, the equations, and/or look-up tables may be based on mathematical operations based on the configuration of the device. In various embodiments, the processing device 12 may include any scaling factor, equation, look-up table, and/or other processing input or description to interpret the input signal applied to the analog-to-digital converter 16 through the input circuit 14.

In addition to the control of the programmable elements and the internal calculations of the processing device 12, the terminal setting may permit the processing device 12 to change settings, such as reference settings. In one example, the terminal setting dictates the reference of the analog-to-digital converter 16, which may be adjusted internal or external to the processing device 12. In such an example, the voltage range of an input signal can be adjusted by adjusting the reference to shift the voltage range to a desired voltage range for the analog-to-digital converter 16. In other embodiments, the terminal setting may be employed to otherwise configure the processing device 12 and/or associated components to receive and/or to interpret the input signal applied to terminals 18 and 20.

The terminal setting may be entered into the controller 10, through one or more inputs to one or more input devices 32 of the controller 10. In some example, a portion of the terminal setting may be selected by the user, while another portion of the terminal setting is entered by the same or a different user. Depending on the device coupled to terminals 18 and 20 and the characteristics of the input signal provided by the device, the terminal setting may define one or more aspects by which the input signal is interpreted.

Additionally, or alternatively, the processing device 12 may be configured to display at the display device 30, one or more preset terminal settings. For example, if a variety of different devices are known to be coupled to the terminals 18 and 20, one or more preset terminal settings associated with the known devices may be stored within the processing device 12. As an example, a preset terminal setting may correspond to a 10K NTC (Negative Temperature Coefficient) device. In the exemplary embodiment, the processing device 12 may display, at display device 30, a list of preset type settings, including the preset terminal setting for the 10K NTC device. Accordingly, the user is able to select the corresponding preset terminal setting, which includes a signal type and range, and/or some or all of the information suitable to accept and/or interpret the input signal from the 10K NTC device.

Furthermore, the processing device 12 may include one or more default terminal settings, which may be used when no terminal setting is received from a user or only a partial terminal setting is received. In at least one embodiment, the default terminal setting causes the processing device 12 to control programmable elements 22, 24, and/or 26 to substantially inhibit damage to the processing device 12. For example, the resistance associated with programmable elements 24 and 26 may be set sufficiently high/low to limit the voltage applied to the analog-to-digital converter 16. As should be apparent, one or more other default terminal settings may be used in various different controller embodiments, having several configurations of programmable elements, to substantially inhibit damage to the processing device 12 regardless of the type and range of input signals applied to terminals 18 and 20. Default terminal settings may be provided based on other factors, such as most popular devices, customer requests, other indication of likely inputs signals received by the controller 10, or any other standard or convention associated with the controller 10, the customer, and/or the system in which the controller 10 is intended to be installed.

In the exemplary embodiment, the processing device 12 may further scale and/or adjust the measure voltage to interpret the input signal, based on the control of the input circuit 14. For a voltage signal, for example, which is an operating parameter of the processing device 12, the input circuit 14 is controlled to divide the voltage according to the resistance of programmable elements 24 and 26. In one example, the signal applied to the processing device 12 has a voltage of 10 VDC, when the input signal applied to terminals 18 and 20 has a voltage of 24 VDC. The processing device 12 may scale and/or adjust the measured voltage of 10 VDC to accurately interpret the information indicated by the 24 VDC input signal at terminals 18 and 20. It should be appreciated that various different operations may be employed by the processing device 12 to scale and/or adjust the measured voltage and/or calculation to account for the operation of the input circuit 14.

Further, while the controller 10 includes a single input circuit 14 associated with terminals 18 and 20, it should be appreciated that a controller may include additional inputs circuits and terminals, to thereby provide multiple pairs of terminals suitable to accept multiple different types of input signals. Referring again to FIG. 2, for example, the controller 100 includes four pairs of terminals 119*a-d*. Each pair of terminals is associated with separate input circuits 114*a-d*. Each input circuit 114*a-d* may be connected to a separate analog-to-digital converters 116*a-d* of the processing device 112. Alternatively, one or more multiplexing circuits may be used to connect the input circuits 114*a-d* to less than four analog-to-digital converters 116. It should be apparent that the processing device 112 is suited to receive a terminal setting for each of the terminal pairs 119*a-d* consistent with exemplary embodiments disclosed herein. Accordingly, different types and/or ranges of signals may be received by each of the terminal pairs 119*a-d*. As such, the controller 100 includes four separately programmable terminal pairs 119*a-d*. It should be appreciated that any number of input circuits and associated terminal pairs may be employed in other controller embodiment, to provide any suitable number of terminal pairs by the controller 10 for connecting to devices. Further, while terminal pair is generally understood to denote two separate terminals for each terminal pair, a common terminal among two or more terminal pairs may provide one terminal of the terminal pair.

Figure 3:
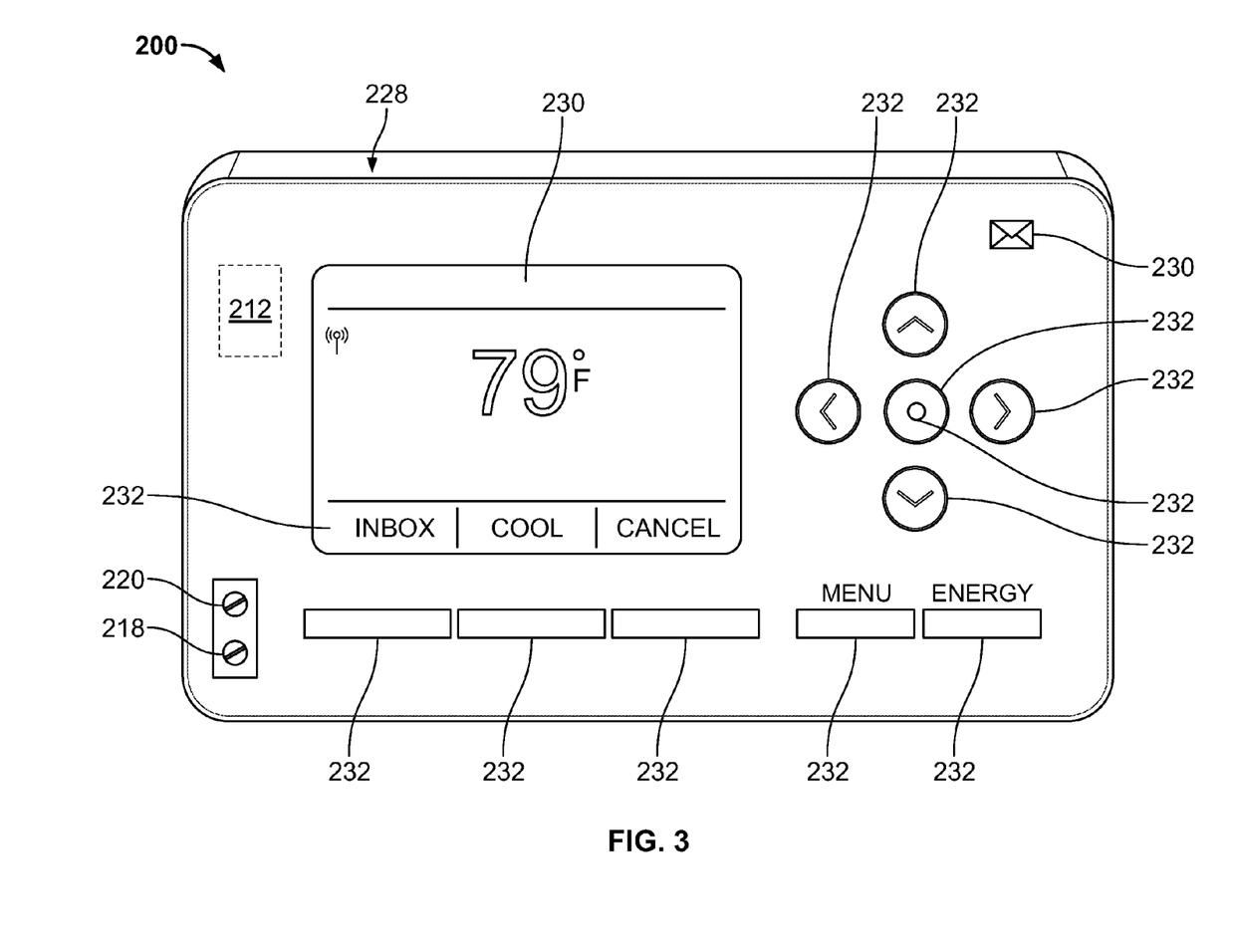
FIG. 3 illustrates an exemplary thermostat according to yet another exemplary embodiment.

FIG. 3 illustrates an exemplary thermostat embodiment. In the exemplary embodiment, the thermostat 200 includes a processing device 212, terminals 218 and 220, and a user interface 228. As shown, the user interface 228 includes a display device 230 and a plurality of inputs devices 232. The input devices 232 include multiple buttons and directional pads. The display device 230 is an LED display, which is provided to display a variety of different information about the system. In this exemplary embodiment, the display device 230 display temperature information, rate information, and control selections information. Information displayed at display device 230 may be interpreted from one or more input signals received at terminals 218 and 220.

The thermostat 200 includes an input circuit (not shown), which is the same or substantially consistent with one or more of the input circuits described herein. The processing device 212 controls the input circuit to accept and to interpret multiple different types of input signals. The thermostat 200 is usable in a variety of different systems, such as, for example, a climate control system or other systems. Example devices that may be coupled to the terminals of the thermostat 200 may include, without limitation, a temperature sensor, a relative humidity sensor, a pressure sensor, a suction sensor, a contact sensor, a motion sensor, an outdoor temperature sensor, a light sensor, a fan speed sensor, or any other types of sensor to indicate one or more states or conditions within the system and/or affecting the sensor.

By providing an input to the "Menu" button, a user may access the terminal setting associated with the terminals 218 and 220. The terminal setting may be selected, entered, and/or altered by one or more inputs to the input device 232 of the thermostat 200. In one example, a temperature sensor (e.g., thermistor or other temperature sensing means, etc.) is coupled to the thermostat 200 and used as a remote temperature sensor. The remote temperature sensor is a Brand X remote temperature sensor. In this example, the user is able to select and/or enter a preset terminal setting associated with the remote temperature sensor. Specifically, the user is able to navigate through one or more menus at display device 230 to ultimately select a preset terminal setting, which is named accordingly, such as, for example, "Brand X Remote Temperature Sensor". In another example, a current level indicative of proper operation might be detected and used to determine operating current of an operating device, such as a motor (e.g., a HVAC blower motor, etc.). This information might also be displayed to a user via a menu selection at display device 230. The user would configure the terminals 218 and 220 in this instance through an additional menu item, by selection of a preset terminal setting named, for example, "Current Level Sensor". This menu item might be displayed in the same list of preset terminal settings as (or a different list than) the previous example of "Remote Temperature Sensor".

In another exemplary embodiment, a method for accepting multiple different types of input signals is disclosed. The method includes receiving an input signal indicative of a condition on a system, controlling at least one parameter of at least one programmable element of the input circuit based on a terminal setting and at least one operating parameter of the processing device, and interpreting the input signal.

In one or more embodiments, the method may include displaying, at a user interface, a plurality of terminal settings and receiving, at the user interface, a selection of the terminal setting from the plurality of terminal settings. Additionally, or alternatively, the method may include receiving, at a user interface, a selection of the terminal setting from a plurality of preset terminal settings, the selected preset terminal setting corresponding to a device coupled to the input circuit. Further, in some embodiments, interpreting the input signal may include interpreting the input signal based on an input signal range indicated by the terminal setting. Moreover, in at least one exemplary method, controlling the at least one parameter of the at least one programmable element of the input circuit includes controlling the resistance of a plurality of programmable elements based on the terminal setting.

In some embodiments, technical effects of the methods, controllers, thermostat, and systems described herein include at least one of: a) receiving, at an input circuit, an input signal indicative of a condition on a system, (b) controlling, by a processing device, at least one parameter of at least one programmable element of the input circuit based on a terminal setting and at least one operating parameter of the processing device, and (c) interpreting, by the processing device, the input signal.

Another exemplary embodiment is directed toward a software configurable analog to digital port or terminal on a device, such as a thermostat, other controller, etc. This exemplary embodiment is configured to use a single circuit that brings all input types and ranges expected into the safe and measurable range for a controller's analog to digital port. The input and type may be specified in the device user interface via software, such that the controller can either (a) change its reference and/or (b) change its interpretation of the digitized value. The terminal or port may have several ranges of voltage, resistance, or current input as a function of the application in which the device will be used in. A user may select the application from a user interface associated with the device, such that the controller (e.g., thermostat, etc.) will understand or know how to properly interpret the voltage, resistance, or current level. For example, if the device is a thermostat, the input might be a temperature sensor (e.g., thermistor, etc.) used as a remote temperature. In this example, the user may configure the port through a menu selection labeled "Remote Sensor". In another exemplary application, a current level indicative of proper operation might be detected and used to determine operating current, such as when a device like a motor is operating, for example. This information might also be displayed to a user via a user interface menu selection. The user may configure the port in this second example application through an additional or alternative menu item, which might be indicated as "Current Level Sensor". This menu item might be displayed in the same list as the previous example of "Remote Sensor". The controller interprets the input as a function of the type of input selected by the user through a menu, and the relationships disclosed herein. This exemplary embodiment may thus enable a single analog to digital port in a microprocessor to determine a voltage, current or resistive value. By way of example, there may two inputs into the ADC circuit; one for voltage or resistance and a second for current. In another example, there may be only one terminal set. The resistances may be software settable in terms of value.

Exemplary embodiments disclosed herein may provide one or more (but not necessarily any or all) of the following advantages. For example, a single input circuit having one or more programmable elements may be provided, such that the programmable element(s) are utilized to receive an input signal regardless of the type of signal received by the controller. In this manner, the single input circuit may provide efficiency and cost savings, as compared to one or more known devices, which include separate and dedicated circuitry for each type of signal received by the device. Further, the exemplary controllers and methods herein may provide advantages in efficiency and/or ease of use, e.g., because the user may specify the terminal setting (e.g., input type and/or range, etc.) in only one place (e.g., via a menu at a user interface, etc.). Further still, the programmable elements may be controlled (or defaulted) to inhibit damage to the controller regardless of whether or not a type of the input signal has been specified correctly or not at all.

Moreover, if control of programmable elements causes distortion and/or adjustments to the input signal to inhibit damage to the controller, and more specifically, the analog-to-digital converter, exemplary embodiments may include additional operations (based on the known control of the programmable elements) to compensate for the distortion and/or adjustments. Such compensation may be provided through scaling factors, equations, and/or look-up tables, which are compiled based on empirical data, derived mathematically, or otherwise.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements may be present. For example, one or more resistors may be coupled between two elements, which are "connected" to one another. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A controller for use in accepting multiple different types of input signals, the controller comprising:
    an input circuit including first and second terminals for receiving an input signal and at least one programmable resistor coupled to the first terminal; and
    a processing device coupled to the input circuit, the processing device configured to control a resistance of the at least one programmable resistor based on a terminal setting, the terminal setting indicating whether the input signal is a voltage signal, a current signal, or a resistance signal, the processing device configured to interpret the input signal applied to the processing device via the input circuit;
    wherein the controller comprises a thermostat.

2. The controller of claim 1, further comprising a user interface coupled to the processing device and configured to receive a user input indicative of the terminal setting.

3. The controller of claim 2, wherein the terminal setting is a preset terminal setting associated with a device coupled to the first and second terminals, the terminal setting further indicating at least one of a voltage range, a resistance range, and a current range associated with the input signal.

4. The controller of claim 2, wherein:
    the user interface includes a display device; and
    the processing device is configured to solicit, via the display device, the user input indicative of the terminal setting from a user.

5. A controller for use in accepting multiple different types of input signals, the controller comprising:
    an input circuit including first and second terminals for receiving an input signal and at least one programmable resistor coupled to the first terminal; and
    a processing device coupled to the input circuit, the processing device configured to control a resistance of the at least one programmable resistor based on a terminal setting, the terminal setting indicating whether the input signal is a voltage signal, a current signal, or a resistance signal, the processing device configured to interpret the input signal applied to the processing device via the input circuit;
    wherein:
        the at least one programmable resistor includes a first programmable resistor and a second programmable resistor connected in series with the first programmable resistor, the first and second programmable resistors connected across the first and second terminals; and
        the processing device includes an analog-to-digital converter having an input, the first programmable resistor connected across the input of the analog-to-digital converter.

6. The controller of claim 5, wherein the at least one programmable resistor includes a third programmable resistor connected between the first terminal and a voltage source.

7. The controller of claim 6, wherein the processing device is configured to set the third programmable resistor to a substantially high resistance relative to the resistances of the first and second programmable resistors, and to control resistances of the first and second programmable resistors according to at least one operating parameter of the analog-to-digital converter when the terminal setting indicates the input signal is a voltage signal.

8. The controller of claim 6, wherein the processing device is configured to calculate the resistance of the input signal based on the resistances of the first and the second programmable resistors and a known voltage at the voltage source when the terminal setting indicates the input signal is a resistance signal.

9. The controller of claim 6, wherein the processing device is configured to set the third programmable resistor to a substantially high resistance relative to the resistance of the second programmable resistor and to control the resistance of the third programmable resistor according to at least one operating parameter of the analog-to-digital converter when the terminal setting indicates the input signal is a current signal.

10. The controller of claim 5, wherein the controller comprises a thermostat.

11. A controller for use in accepting multiple different types of input signals, the controller comprising:
an input circuit including first and second terminals for receiving an input signal from a device within a climate control system, the input circuit including a first programmable element;
a user interface for receiving a terminal setting from a user; and
a processing device coupled to the input circuit and the user interface, the processing device configured to set a parameter of the first programmable element to a value when the terminal setting indicates the input signal is one type of signal, and to set the parameter of the first programmable element to a different value when the terminal setting indicates the input signal is a different type of signal;
wherein the processing device is configured to interpret the input signal applied to the processing device via the input circuit; and
wherein:
the user interface includes a display device; and
the processing device is configured to solicit, via the display device, at least one user input indicative of the terminal setting from a user.

12. The controller of claim 11, wherein the parameter is at least one of a resistance, a capacitance, and an inductance of the first programmable element.

13. The controller of claim 11, wherein the input circuit includes a current-to-voltage converter coupled to the first programmable element for receiving a current signal.

14. The controller of claim 11, wherein:
the processing device includes an analog-to-digital converter; and
the processing device is configured to measure, at the analog-to-digital converter, the voltage applied to the analog-to-digital converter via the input circuit and to convert the measured voltage to information represented by the input signal based on at least one of the terminal setting, a scaling factor, an equation, and a look-up table, to thereby interpret the input signal.

15. The controller of claim 11, further comprising a second input circuit for receiving a second input signal and including a second programmable element, the input circuit coupled to the processing device; and
wherein the processing device is configured to set a parameter of the second programmable element to a value when a second terminal setting indicates the second input signal is one type of signal, and to set the parameter of the second programmable element to a different value when the second terminal setting indicates the second input signal is a different type of signal.

16. A method for accepting multiple different types of input signals, the method comprising:
receiving, at an input circuit, an input signal indicative of a condition on a system;
controlling, by a processing device, at least one parameter of at least one programmable element of the input circuit based on a terminal setting and at least one operating parameter of the processing device; and
interpreting, by the processing device, the input signal;
wherein the method further comprises displaying, at a user interface, a plurality of terminal settings and receiving, at the user interface, a selection of the terminal setting from the plurality of terminal settings.

17. The method of claim 16, wherein interpreting the input signal includes interpreting the input signal based on an input signal range indicated by the terminal setting.

18. The method of claim 16, wherein controlling the at least one parameter of the at least one programmable element of the input circuit includes controlling the resistance of a plurality of programmable elements based on the terminal setting.

19. The method of claim 16, further comprising receiving, at a user interface, a selection of the terminal setting from a plurality of preset terminal settings, the selected preset terminal setting corresponding to a device coupled to the input circuit.

* * * * *